United States Patent
Blessing et al.

(10) Patent No.: US 11,221,345 B2
(45) Date of Patent: Jan. 11, 2022

(54) ARRANGEMENT OF A ROTARY PULSE ENCODER AND A CLAMPING SLEEVE FOR SENSING THE SPEED OF ROTATION OF A ROTOR

(71) Applicant: KNORR-BREMSE SYSTEME FUER NUTZFAHRZEUGE GMBH, Munich (DE)

(72) Inventors: Michael Blessing, Munich (DE); Andre Kluftinger, Kleinheubach (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 88 days.

(21) Appl. No.: 16/623,506

(22) PCT Filed: Jun. 20, 2018

(86) PCT No.: PCT/EP2018/066492
§ 371 (c)(1),
(2) Date: Dec. 17, 2019

(87) PCT Pub. No.: WO2018/234418
PCT Pub. Date: Dec. 27, 2018

(65) Prior Publication Data
US 2021/0148945 A1 May 20, 2021

(30) Foreign Application Priority Data

Jun. 20, 2017 (DE) ...................... 10 2017 113 604.5

(51) Int. Cl.
*G01P 1/02* (2006.01)
*G01P 3/48* (2006.01)
*G01P 3/487* (2006.01)

(52) U.S. Cl.
CPC .............. *G01P 1/026* (2013.01); *G01P 3/487* (2013.01)

(58) Field of Classification Search
CPC .................................. G01P 1/026; G01P 3/487
See application file for complete search history.

(56) References Cited

U.S. PATENT DOCUMENTS

| 4,075,520 A | 2/1978 | Davy, Sr. |
| 9,310,392 B2* | 4/2016 | Pan .......................... G01P 1/00 |

(Continued)

FOREIGN PATENT DOCUMENTS

| DE | 2715426 A1 | 11/1977 |
| DE | 4423081 A1 | 1/1996 |

(Continued)

OTHER PUBLICATIONS

International Search Report dated Oct. 12, 2018, of the corresponding International Application PCT/EP2018/066492 filed Jun. 20, 2018.

*Primary Examiner* — Reena Aurora
(74) *Attorney, Agent, or Firm* — Norton Rose Fulbright US LLP; Gerard Messina; Aaron Deditch

(57) ABSTRACT

An apparatus of a rotary pulse encoder and a sleeve, including: a rod-shaped rotary pulse encoder; and a clamping sleeve; in which the rod-shaped rotary pulse encoder and the clamping sleeve are in a bore of a holder for sensing a rotational speed of a rotor, in which the clamping sleeve is positioned in the bore so as to be secured against rotation, and the rotary pulse encoder is friction-locked in the clamping sleeve with a sensor head so as to be axially displaceable, in which the sensor head has a non-cylindrically symmetrical cross-section at least in sections, and the clamping sleeve has at least one inwardly facing position-setting element, by (Continued)

which the sensor head is arranged in the clamping sleeve so as to be secured against rotation.

14 Claims, 23 Drawing Sheets

(56) References Cited

U.S. PATENT DOCUMENTS

| | | | |
|---|---|---|---|
| 9,921,236 B2* | 3/2018 | Dalisdas | ............... B60T 8/171 |
| 10,386,382 B2* | 8/2019 | Tomczak | ............... G01P 3/481 |
| 2006/0277985 A1 | 12/2006 | Faetanini et al. | |

FOREIGN PATENT DOCUMENTS

| | | |
|---|---|---|
| DE | 102007056340 A1 | 5/2009 |
| DE | 10 2008 054 000 A1 | 5/2010 |
| DE | 102009054521 A1 | 2/2011 |
| DE | 102010049552 A1 | 4/2012 |
| DE | 102012024762 A1 | 6/2014 |
| DE | 102013010925 A1 | 1/2015 |
| EP | 1284424 A2 | 2/2003 |
| EP | 2133699 A1 | 12/2009 |

* cited by examiner

ARRANGEMENT OF A ROTARY PULSE ENCODER AND A CLAMPING SLEEVE FOR SENSING THE SPEED OF ROTATION OF A ROTOR

FIELD OF THE INVENTION

The present invention relates to an arrangement/apparatus of a rod-shaped rotary pulse encoder and a clamping sleeve in a bore of a holder for sensing a speed of rotation of a rotor, wherein the clamping sleeve is secured against rotation in the bore, and the rotary pulse encoder is friction-locked in the clamping sleeve with a sensor head so that it can be axially displaced.

BACKGROUND INFORMATION

Rotary pulse encoders mounted in this way are used, for example, to measure the speed of rotation of vehicle wheels, especially in the commercial vehicle sector. The measured speed is used, for example, for correct actuation of ABS (anti-lock) braking systems, wherein the rotor is connected to a vehicle wheel and is configured, for example, as a pole gearwheel with alternately aligned magnetic poles.

The axially displaceable clamping holder of the rotary pulse encoder makes it possible to adjust an air gap between the rotor and the rotary pulse encoder. Due to mounting tolerances, thermal expansions or bearing wear which affects the position of the rotor, the rotary pulse encoder can come into contact with the rotor and recede due to the axially displaceable non-positive holder so that there is no damage to the rotary pulse encoder or the rotor.

Passive sensors, such as inductively operating sensors, are referred to as rod-shaped rotary pulse encoders. These can be rotated about their longitudinal axis without affecting the measurement result.

Furthermore, active rotary pulse encoders are believed to be understood, which for example have Hall sensors. The measurement result of such active rotary pulse encoders depends on the rotary position of the rotary pulse encoder within the holder. When using active rotary pulse encoders, correct orientation of the rotary pulse encoder must be ensured by preventing rotation of the rotary pulse encoder about its longitudinal axis.

From the publication DE 10 2008 054 000 A1, an arrangement is discussed in which a rotary pulse encoder is held by a clamping sleeve in a bore of a holder. A connection adapter for electrical contacting is mounted on the rotary pulse encoder. The rotary pulse encoder is configured as an active sensor and held in a given orientation accordingly. For this purpose, an anti-rotation device is provided either between the connection adapter and the holder, or between the connection adapter and the clamping sleeve, wherein the clamping sleeve is then positioned in the bore of the holder so that it cannot rotate relative to the holder. This can be achieved, for example, by outwardly bent lugs of the clamping sleeve, which are inserted into corresponding indentations at the upper edge of the bore.

For example, the anti-rotation device is achieved by arranging pins aligned radially at a distance from the sensor head and parallel to the sensor head on the connection adapter, which engage in additional bores in the holder. The axial displaceability of the sensor head is not affected by the combination of pin and bore by this type of anti-rotation device.

When the anti-rotation device is formed between the connection adapter and the clamping sleeve, a pin is arranged on the clamping sleeve which projects longitudinally beyond the bore and penetrates into a corresponding bore on the adapter. The connection adapter and thus the sensor head are thus fixed in their rotary position, but can still be moved axially. In both cases, it is necessary that the connection adapter protrudes radially (laterally) beyond the diameter of the sensor head to provide the guide pin or a bore for the guide pin radially spaced from the sensor head.

SUMMARY OF THE INVENTION

It is an object of the present invention to create an arrangement of a rod-shaped rotary pulse encoder and a clamping sleeve in which a torsion-proof bearing of the rotary pulse encoder within the clamping sleeve is achieved even without a connection adapter projecting radially beyond the clamping sleeve.

This object is solved by an arrangement with the features as described herein.

An arrangement in accordance with the invention of the type mentioned at the beginning is characterized in that the sensor head has at least in some sections a non-cylindrically symmetrical cross-section, and that the clamping sleeve has at least one inward-facing position-setting element, by which the sensor head is arranged to be secured against rotation in the clamping sleeve.

The non-cylindrically symmetrical cross section of the sensor head itself and the thus interacting position-setting elements of the clamping sleeve allow the sensor head to be held inside the clamping sleeve and thus inside the holder in a torsion-proof and at the same time axially displaceable manner. Since the elements acting together are arranged in the area of the bore, the anti-rotation device is independent of the dimensions of a connection adapter, which accordingly can be configured to save space. The position-setting element contours the clamping sleeve in such a way that it accommodates the non-cylindrically symmetrical cross-section of the sensor head in a torsion-proof manner.

In an advantageous embodiment of the arrangement, the clamping sleeve has at least one inward-facing clamping and positioning element in order to hold the sensor head in an axially displaceable manner. The at least one clamping and positioning element may be rigid or flexible. Furthermore, the at least one clamping and positioning element may comprise at least one rigid dome and a spring element opposite it. The rigid domes serve as contact surfaces for the side surfaces of the sensor head, which is thus precisely positioned in the lateral (radial) direction. The spring elements are then placed in each case on opposite side surfaces and press the sensor head against the domes accordingly. The spring elements thus function as clamping elements which, due to a frictional connection, provide the possibility of axial displacement for adjustment purposes.

In a further development, the two domes are arranged rotated with respect to their radial position in the clamping sleeve, which may be by 90°. The radial position of the sensor head with a minimum number of positioning elements is clearly defined by the arrangement of two radially mutually offset domes.

In another advantageous embodiment of the arrangement, the position-setting element and/or at least one clamping and positioning element is punched or embossed out of a base body of the clamping sleeve. The clamping sleeve can thus be manufactured integrally with all the functional elements mentioned in a simple and cost-effective manufacturing process, in particular a stamping and bending process. When produced in this manner, the clamping sleeve is also mechanically robust and can withstand high thermal loads.

In another advantageous embodiment of the arrangement, the clamping sleeve has at least one element through which it is positioned in a torsion-proof manner in the bore. This element can, for example, be an outwardly projecting lug. It is also possible to use the lug to position the clamping sleeve axially in the bore. The lug can also advantageously be formed in one piece in a stamping and bending process.

In another advantageous embodiment of the arrangement, the shape of the sensor head defines exactly one possible rotational position of the sensor head in the clamping sleeve. For example, a sensor head with a round cross-section and a flattened side offers this characteristic and ensures a correct rotary position, which can be particularly important for active rotary pulse encoders, e.g. those with Hall sensors. Alternatively, the shape of the sensor head can also define more than one possible rotational position of the sensor head in the clamping sleeve, e.g. two positions rotated by 180° if the rotary pulse encoder permits operation rotated by 180°. The possibility of both operating positions can simplify installation.

In another advantageous embodiment of the arrangement, the sensor head is at least partially surrounded by a sheath. The sheathing, which may be metallic, protects the rotary pulse encoder thermally and allows it to be used in environments with higher temperatures. The sheathing can, for example, be made from a thin sheet using a deep-drawing process.

The invention will be explained in more detail in the following by the embodiment examples shown the drawings.

DETAILED DESCRIPTION

Figure 1:
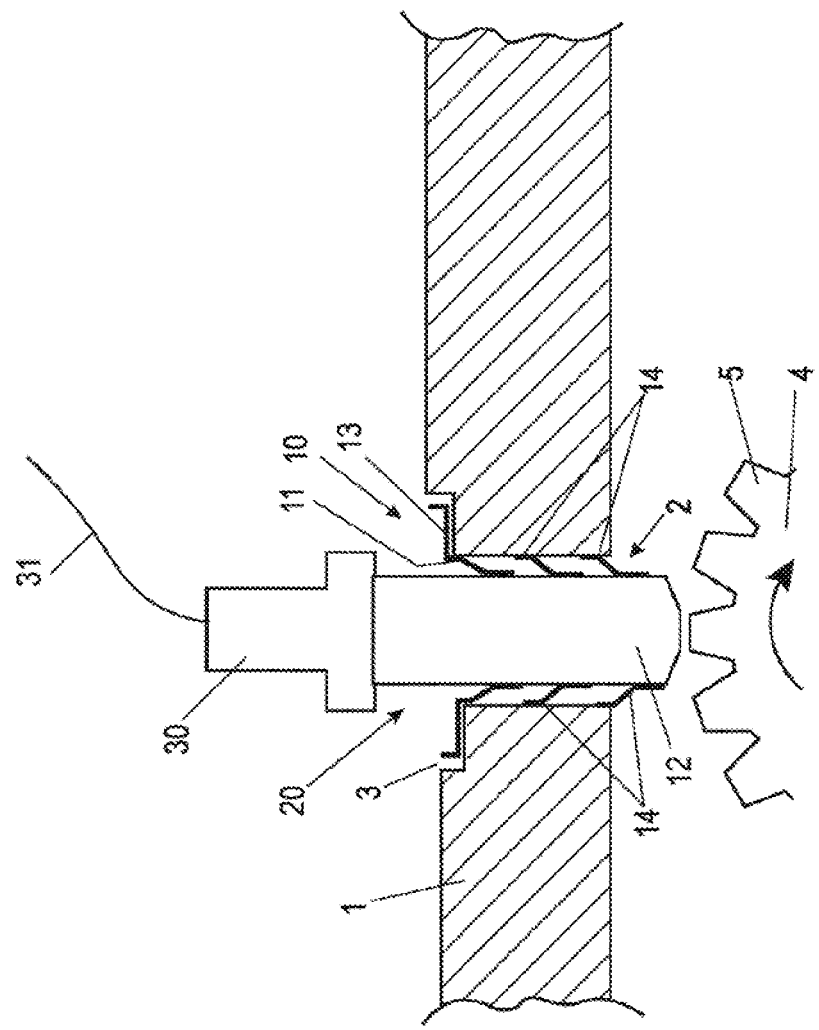
FIG. 1 shows a schematic cross-sectional drawing through a holder with clamping sleeve and inserted sensor for sensing a rotation of a rotor.

FIG. 1 first shows a basic structure of an arrangement according to the application in a schematic cross-section drawing.

Shown is a holder 1 into which a continuous bore 2 has been introduced. A clamping sleeve 10 is inserted in bore 2 to fix a sensor head 22 of a rotary pulse encoder 20 in bore 2. Instead of the term "rotary pulse encoder", the term "sensor" is also used in the following.

The sensor 20 protrudes with the sensor head 22 from the bore 2 in such a way that a front end of the sensor head 22, hereinafter also referred to as measuring tip 23, is positioned opposite an outer edge of a rotor 4. The rotor 4 is provided with a plurality of pole teeth 5 which generate an alternating magnetic field in the area of the sensor head 21 when the rotor 4 rotates. This is detected by sensor 20, so that speed sensing of rotor 4 is possible.

On the rear side of the sensor 20 opposite the measuring tip, it has a sensor base 21 on the outside of which connections of the sensor 20 are arranged. In the example shown, the sensor 20 is electrically connected via a connection adapter 30 and a connection cable 31. It is understood that instead of a pluggable connection adapter 30, a fixed connection can also be provided, which inseparably merges into the connection cable 31.

The arrangement of the sensor 20 in the bore 2 through the clamping sleeve 10 allows an axial displaceability of the sensor 20 along its longitudinal axis in order to set a distance to the pole teeth 5 of the rotor 4 or in order to enable the sensor 20 to recede without damage on contact with the rotor 4 and to set the axial position of the sensor 20 itself in this way.

In this case, the clamping sleeve 10 itself is held in a torsion-proof manner in the bore 2, in the embodiment example shown by lugs 13 which are bent outwards at a rear edge of the clamping sleeve 10 (as seen from the measuring tip 23) and which are inserted in recesses 3 which are formed on the circumference of the bore 2. The clamping sleeve 10 has a tubular base body 11, which comprises various inwardly facing clamping and positioning elements 14, which are used for the axially displaceable and at the same time torsion-proof holding of the sensor 20. The clamping and positioning elements 14 are explained in more detail from FIG. 3a onwards.

Figure 2A:
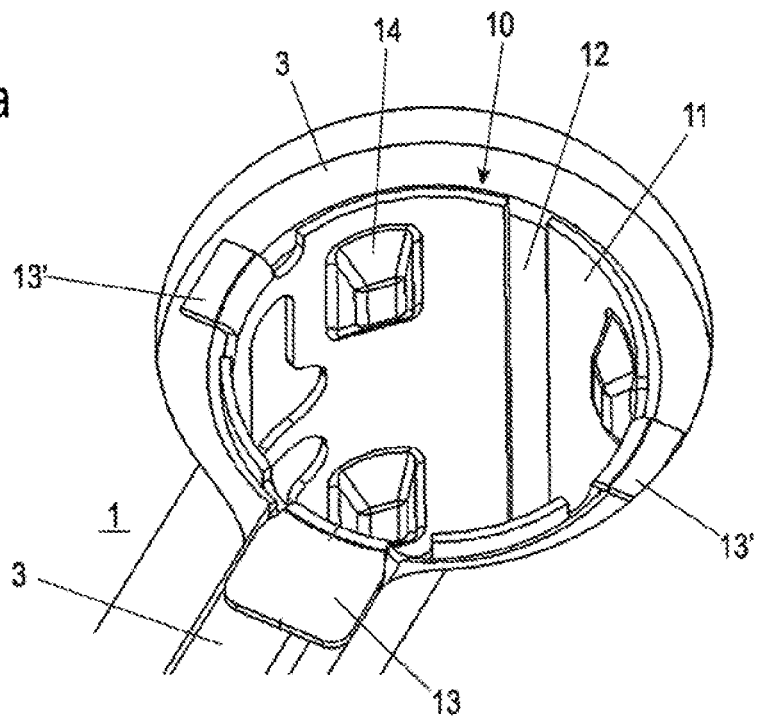
FIG. 2a shows a schematic isometric representation of a clamping sleeve inserted into a holder.
Figure 2C:
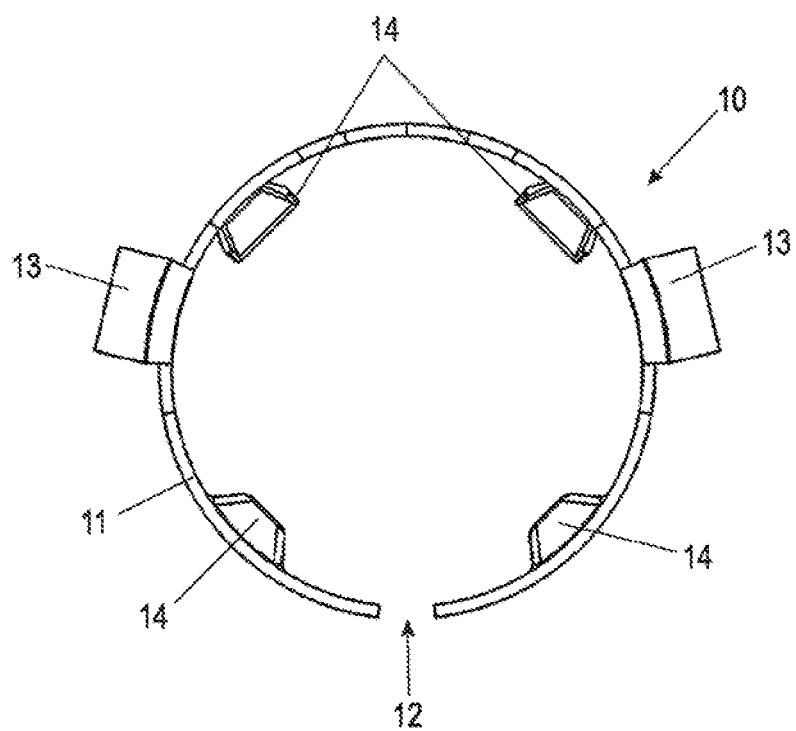
FIG. 2c shows an alternative embodiment of a clamping sleeve.
Figure 2B:
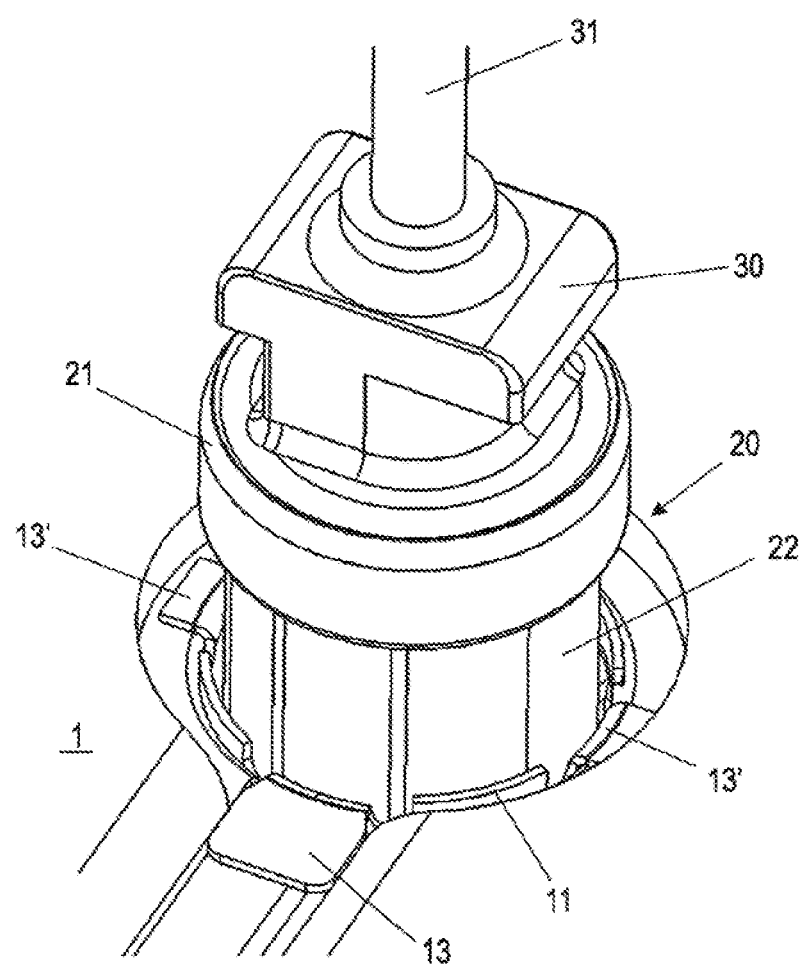
FIG. 2b shows the arrangement according to FIG. 2a with inserted sensor.

In FIGS. 2a and 2b, in each case in the form of an isometric representation, the holder 1 according to FIG. 1 is shown with the inserted clamping sleeve 10 without the sensor 20 (FIG. 2a) or with the sensor 20 (FIG. 2b). In the drawings it can be clearly seen that the recess 3 in the holder 1 surrounds the edge of the bore 2 in the manner of a shoulder which merges into a groove at one point. One of the lugs 13 of the clamping sleeve 10 engages in this groove, which prevents twisting of the clamping sleeve 10 in the holder 1. The other two lugs 13' rest in the area on recess 3 in which this circularly surrounds bore 2. A torsion protection is not provided by these lugs 13', but a defined position of the clamping sleeve 10 in bore 2 in axial direction is.

FIG. 2b shows the arrangement according to FIG. 2a with the sensor 20 inserted, which is connected via the connection adapter 30 and the connection cable 31.

FIG. 2c shows an alternative embodiment of the clamping sleeve 10, which differs in the number and arrangement of the lugs 13. FIG. 2c shows the clamping sleeve 10 in a plan view of the upper edge where the lugs 13 are arranged. In this embodiment, two lugs 13 are not formed exactly diametrically opposed to each other. This clamping sleeve 10 is suitable for use in a holder 1, which has two separate recesses as recesses for the individual lugs 13. Both lugs 13 then serve both to prevent rotation and to define the axial position of the clamping sleeve 10 in the holder 1. Instead of individual recesses for the lugs 13, suitable elevations can also be provided on the upper side of the holder 10 which surround the lugs 13.

What all the clamping sleeves 10 shown in the context of this application have in common is that they may be made of an elastic sheet metal material, for example beryllium copper, particularly in a stamping and bending process, so that they can be produced in one piece with few work steps.

They advantageously comprise a tubular base body 11 with an axial slot 12, in order to be able to be manufactured using the aforementioned stamping and bending process and to be fitted in the bore 2 so as to be well clamped.

Figure 3A:
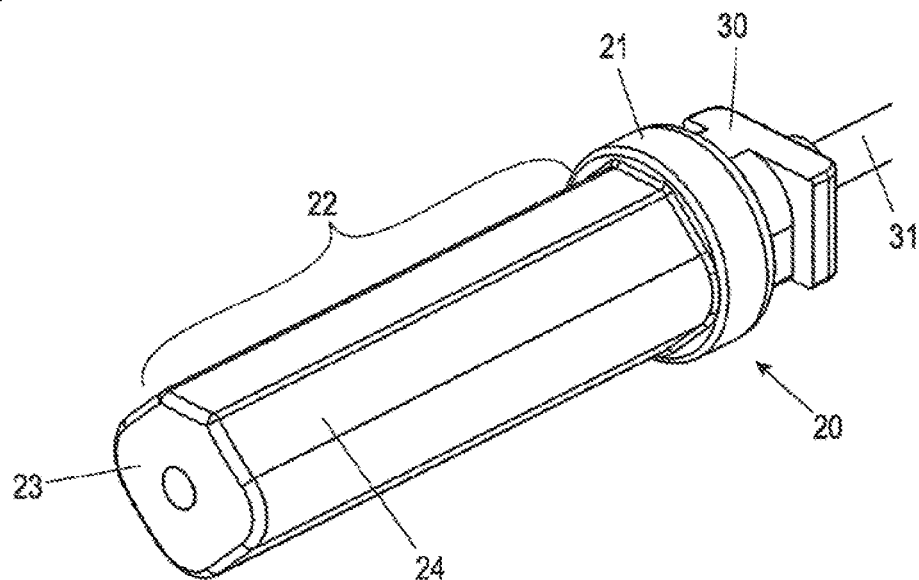
FIGS. 3a, 3b and 3c show different views of an arrangement of a sensor and a clamping sleeve in a first embodiment example.
Figure 3B:
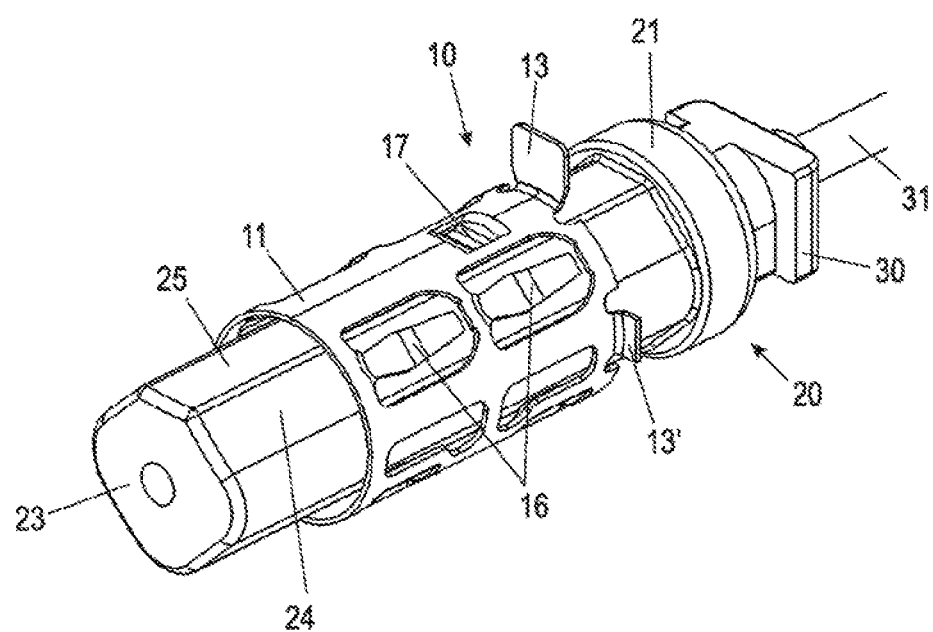
Figure 3C:
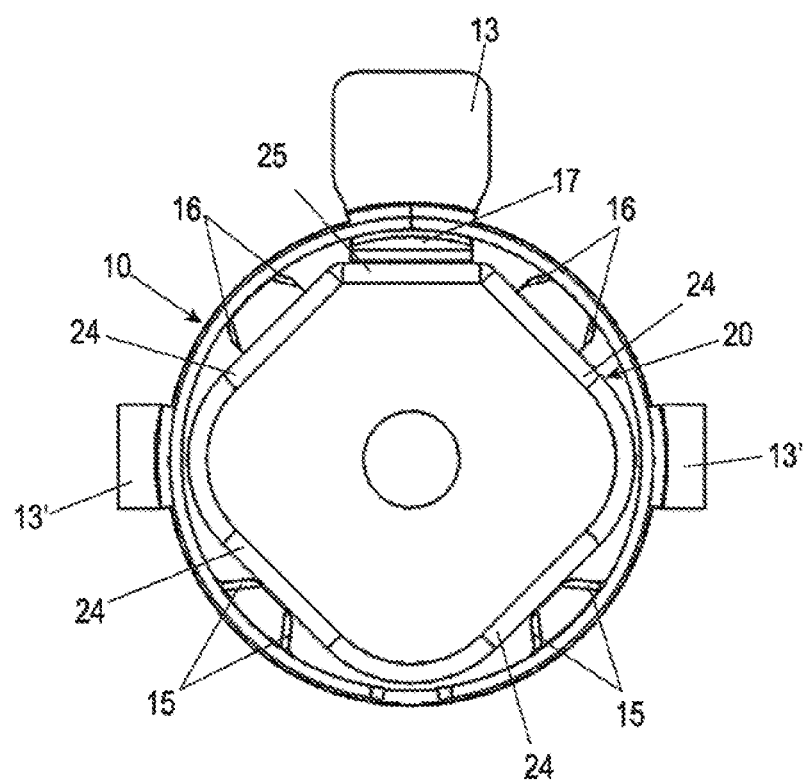

The interaction of the clamping sleeve 10 with the sensor 20 of the first embodiment example is shown in more detail in FIGS. 3a to c. FIG. 3a first shows the sensor 20 of the first embodiment example with the connection adapter 30 separately in an isometric representation.

The sensor 20 has a cylindrical sensor base 21, on the outside of which the connection adapter 30 is attached. On the side of the sensor base 21 opposite the connection adapter 30, a rod-shaped sensor head 22 is formed, which leads into the measuring tip 23. With the sensor 20 shown, the cross-section over the entire length of the sensor head 22 is uniformly non-cylindrical. The cross-section corresponds essentially to that of a quadrilateral with four side faces 24 and three rounded corners and a flattened (or chamfered) corner. The axially extending surface formed by this flattening or chamfering is hereinafter also referred to as the orientation surface 25.

FIG. 3b shows the sensor 20 inserted into the clamping sleeve 10 in the same way as FIG. 3a. FIG. 3c shows the arrangement of clamping sleeve 10 and inserted sensor 20 in a plan view of the measuring tip 23 of sensor 20.

In FIGS. 3b and 3c, the elements referred to together as clamping and positioning elements 14 in the previous figures are presented in a more differentiated way. Along the circumference of the base body 11 there are initially domes 15 and spring elements 16 arranged in pairs opposite each other. Domes 15 are rigid elements with side surfaces 24 adjacent to them. They thus act as positioning elements. The domes 15 are rotated 90° to each other and support two adjacent side faces 24.

On the opposite side faces 24 there are spring elements 16, which press the sensor head 22 against the domes 15 and are thus axially displaceably fixed. The spring elements 16 thus act as clamping elements.

In the middle between two of the spring elements 16 there is a position-setting element 17 protruding inwards, which faces towards the orientation surface 25 of the sensor 20.

With regard to the dome 15 or spring elements 16, it would be possible to insert the sensor 20 in four different orientations, each rotated 90° to each other. However, due to the position-setting element 17 and the orientation surface 25, the sensor 20 can only be inserted into the clamping sleeve 10 in a defined orientation, as shown in FIGS. 3b and 3c. In the example shown, the position-setting element 17 is positioned exactly below the lug 13. The position of the position-setting element 17 can thus be easily identified by of the lug 13 if the clamping sleeve 10 is already inserted into the bore 2 of the holder 1. When mounting the sensor 20, the orientation surface 25 can be aligned using the lug 13.

The domes 15, the spring elements 16 and the position-setting element 17 may be punched or stamped out of the base body 11 of the clamping sleeve 10 so that the clamping sleeve 10 can be manufactured in one piece.

Figure 4A:
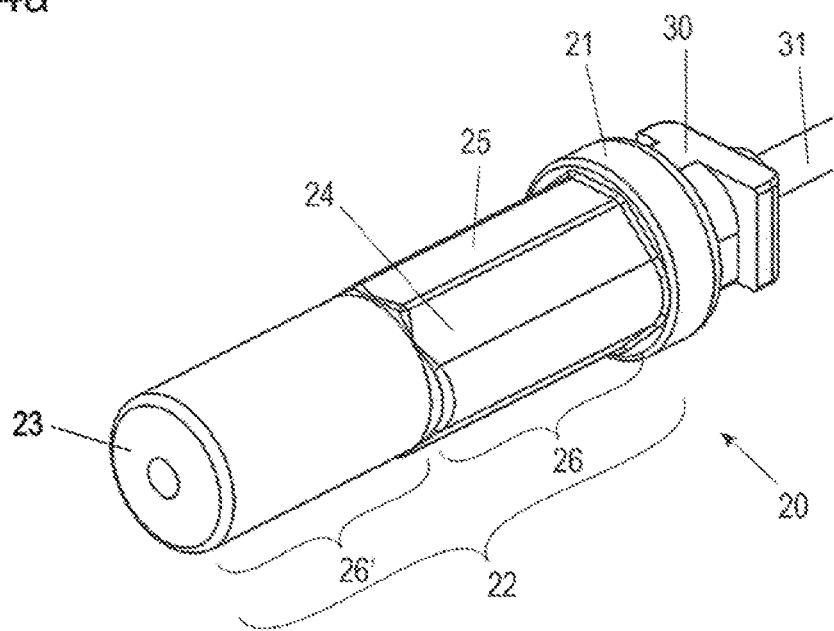
FIGS. 4a, 4b, 4c, and 4d show different views of a modification of the arrangement of the first embodiment example.
Figure 4B:
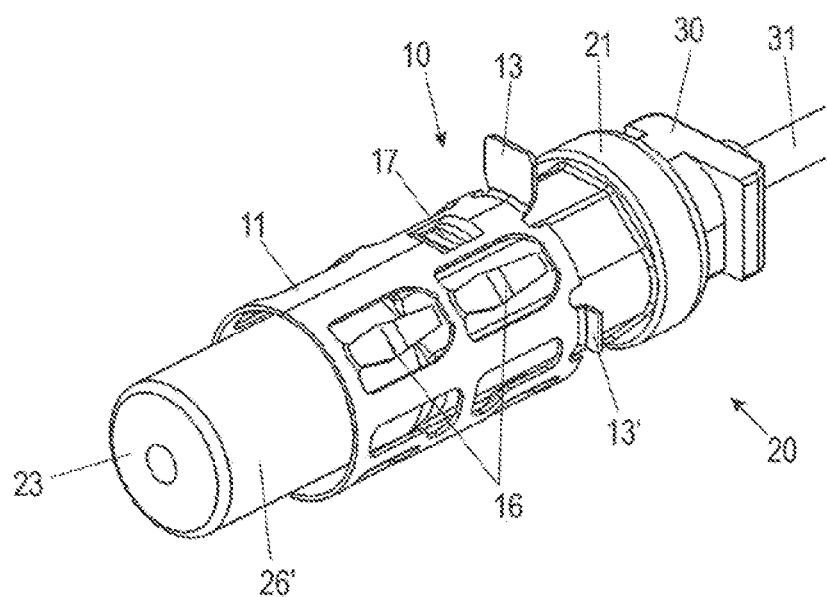
Figure 4C:
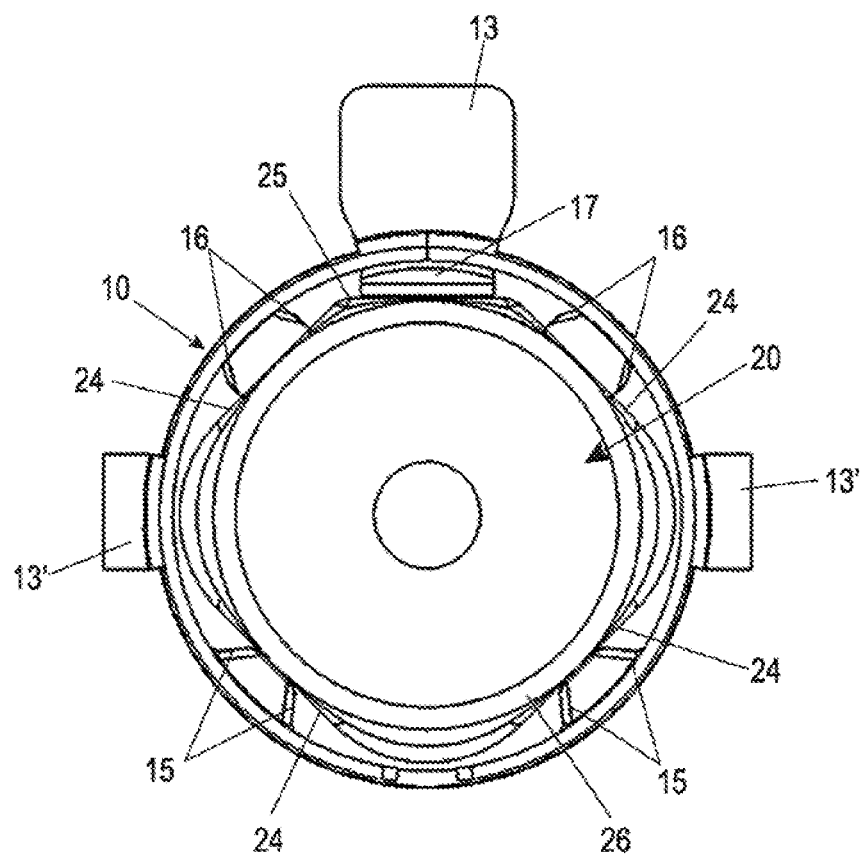

FIGS. 4a to 4c show a modification of the first embodiment example in the same way as FIGS. 3a to 3c. The same reference numerals mark in these as in the following figures the same or equivalent elements as in the previously described figures.

The example shown in FIGS. 4a to 4c does not differ from the basic structure shown in FIGS. 3a to 3c. One difference is that with sensor 20 the non-cylindrical, i.e. non-round cross-section, is not formed over the entire length of the sensor head 22, but only in a first section 26, which adjoins the base 21 of sensor 20.

A further section 26' following the measuring tip 23, on the other hand, is formed in a cylindrically symmetrical manner. The diameter of the further, cylindrically symmetrical section 26' is selected in such a way that the side faces 24 of the non-cylindrically symmetrical section 26 and if necessary also the orientation surface 25 extend tangentially to the circumference of the further section 26'. Accordingly, when the sensor module 20 is inserted, it is guided through the domes 15 and the spring elements 16 in the further section 26' in a comparable manner and held force-locked, as it is in the non-cylindrically symmetrical section 26. The radial positioning and clamping of the sensor 20 is therefore independent of whether the domes 15 and the spring elements 16 are located in section 26 or in the following section 26'. The anti-rotation device is still provided by the interaction of the position-setting element 17 and the orientation surface 25. Since the position-setting element 17 is formed in the rear area of the clamping sleeve 10, an anti-rotation device is provided in a typical insertion position as shown in FIG. 4.

Figure 4D:
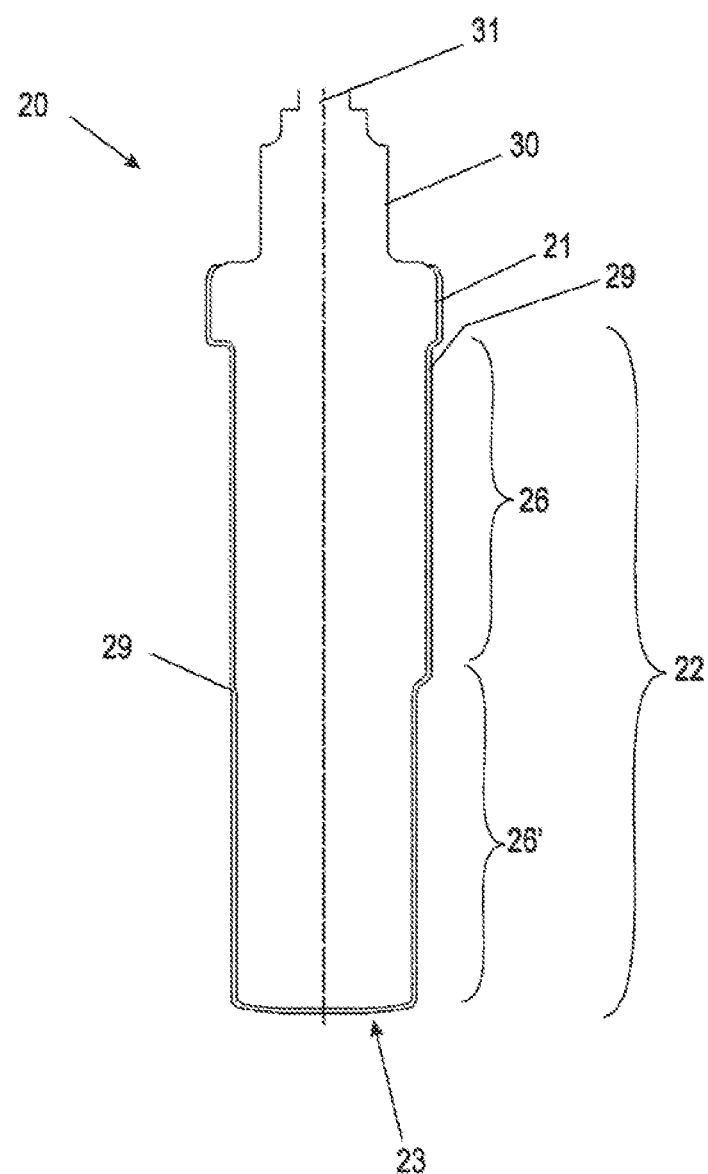

FIG. 4d shows a modification of the embodiment example shown in FIGS. 4a-c in a longitudinal section through the measuring tip 23 of Sensor 20. Basically, sensor 20 as shown in FIG. 4d has the same structure as sensor 20 as shown in FIGS. 4a-c. In addition to the structure described above, the sensor of FIG. 4d has a sheathing 29 which surrounds the sensor head 22. The sheathing 29 may be formed from a thin metal and, for example, in the form of a deep-drawn sleeve. For example, a non-magnetic material, in particular aluminum, can be used. The shown sheathing 29 surrounds the sheath surfaces of the sensor head 22 as well as the measuring tip 23. The sheathing 29 serves as a thermal shield for the sensor head 22 and leads to a higher temperature resistance of the sensor 20. The shape of the sensor head 22 makes it possible to insert a sleeve as sheathing 29, which is placed over the sensor head 22 and fits tightly on all surfaces.

Figure 5A:
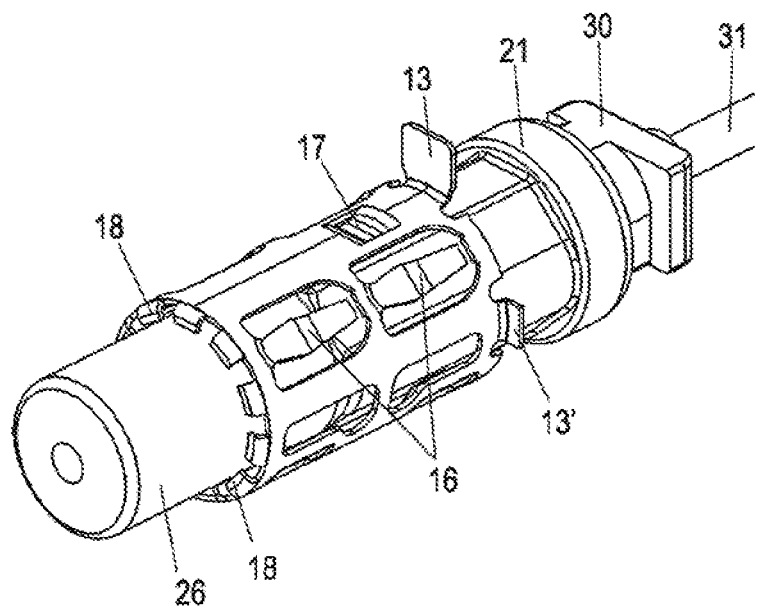
FIGS. 5a and 5b show different views of a further modification of the arrangement of the first embodiment example.
Figure 5B:
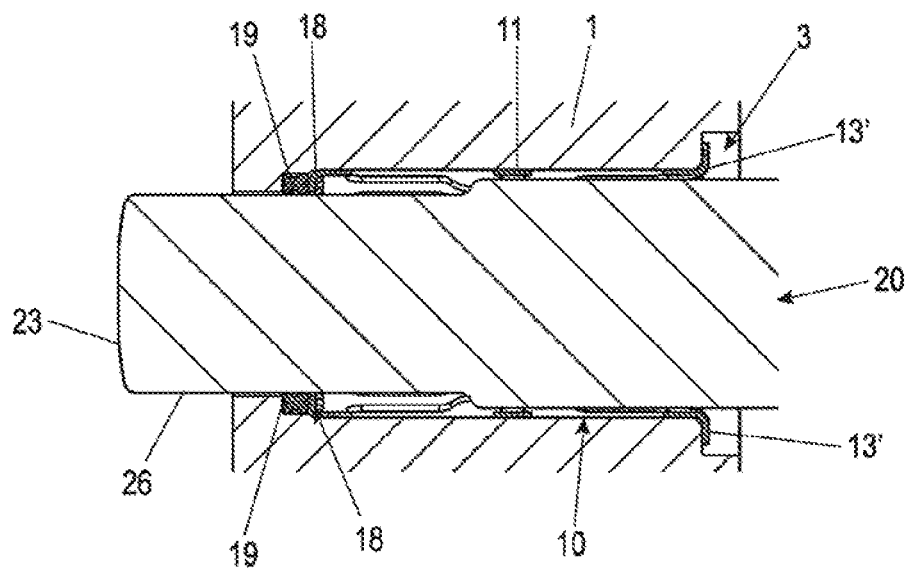

FIGS. 5a and 5b show a variation of the clamping sleeve 10 which can be used in conjunction with the sensor 20 with the front cylindrically symmetrical section 26.

FIG. 5a shows the clamping sleeve 10 in this variant with inserted sensor 20 in an isometric representation analogous to FIG. 4b.

In this embodiment of the clamping sleeve 10, angled retaining lugs 18 are arranged at the front edge to which a sealing element 19 can be attached. The sealing element 19 may be circumferential and can, for example, have a rectangular or round cross-section.

FIG. 5b shows a cross-section through a holder 1, into which the arrangement of clamping sleeve 10 and sensor 20 according to FIG. 5a is inserted. On this holder, the bore 2 is configured in the holder in which the clamping sleeve 10 is inserted as a stepped hole so that a shoulder is created on which the seal 19 rests. In the lower area, bore 2 has a smaller diameter through which the sensor head with its front cylindrically symmetrical section 26' protrudes. In the manner shown, the sensor 20 is sealed against the holder 1 in order to prevent water, oil and/or dust from penetrating into the area of the clamping sleeve 10 and thus also into the area of the connections of sensor 20.

It should be noted that the above modification of holder 1 and the use of seal 19 can also be used in the following embodiment examples of sensors having a front cylindrically symmetrical section 26'. The modification of the clamping sleeve 10 with the retaining lugs serves to ensure that the seal 19 is also pulled out when the clamping sleeve 10 is removed. In principle, a seal 19 can also be used without additional retaining lugs 18 on the clamping sleeve 10. In addition, it is noted that corresponding retaining lugs 18 may also be used for the other clamping sleeves 10 shown in this application.

Figure 6A:
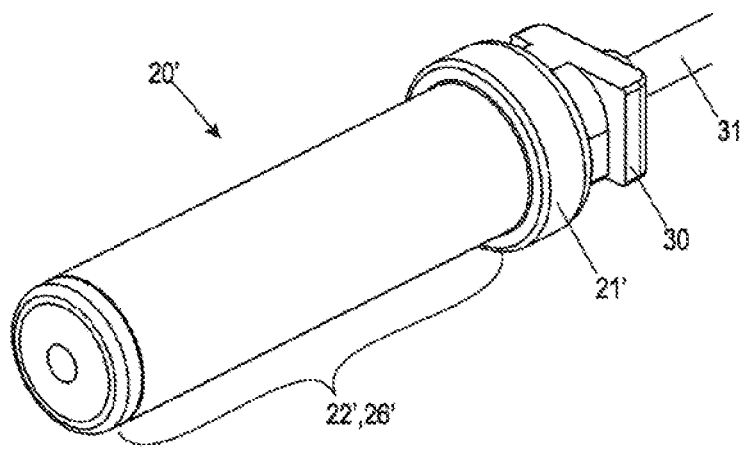
FIGS. 6a, 6b, 6c, and 6d show different views of a clamping sleeve arrangement of the first embodiment example with a passive sensor.
Figure 6B:
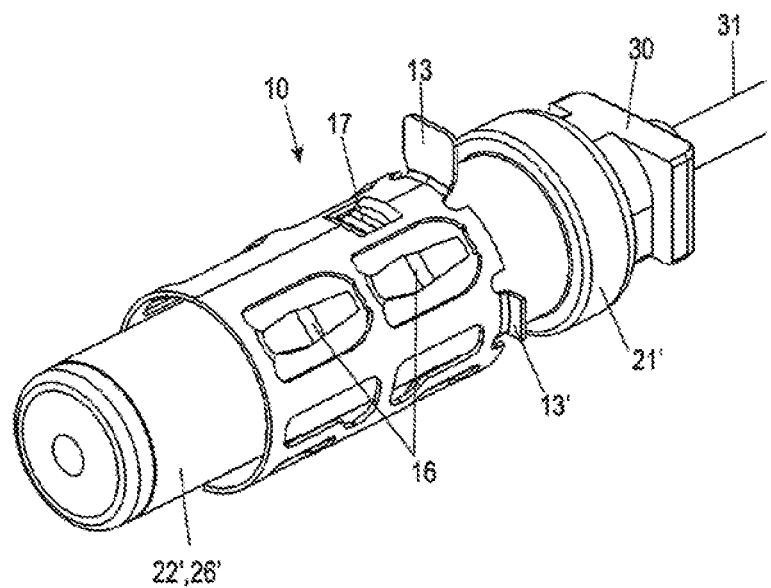
Figure 6C:
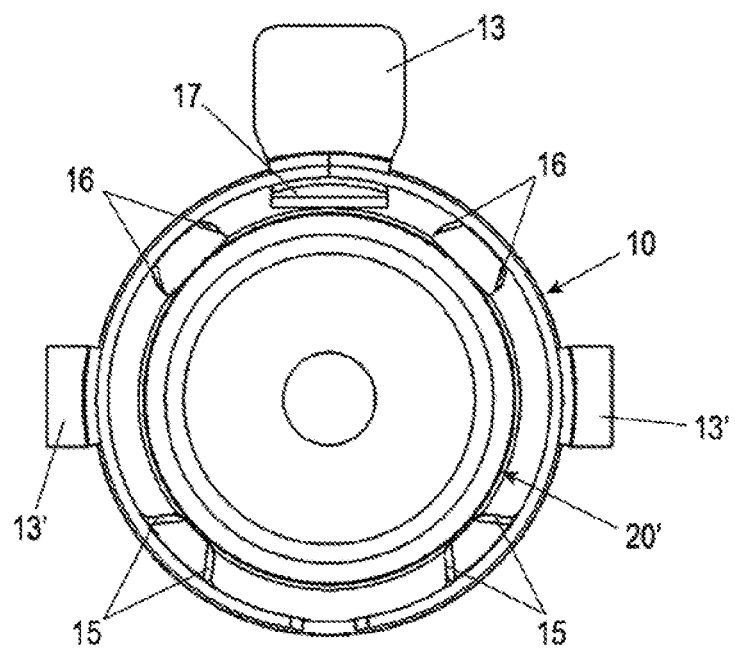

FIGS. 6a to 6c show in the same way as FIGS. 3a to 3c the use of a passive sensor 20' in the clamping sleeve 10 of the first embodiment example.

The figures demonstrate an advantage of the arrangement according to the registration, namely the backward compatibility to passive sensors 20', with which an orientation can be dispensed with and which have no orientation surfaces. With the passive sensor 20', for example an inductively operating sensor, the entire sensor head 22' is configured as a cylindrically symmetrical section 26'. The diameter corresponds to the diameter of the active sensor 20 as shown in FIG. 4a in the cylinder symmetric section 26'.

Both the orientation-dependent active sensor 20 and the passive sensor 20' can be inserted into one and the same clamping sleeve 10, which has the position-setting element 17. This simplifies production and warehousing costs, as only one type of clamping sleeve 10 has to be manufactured and stocked for different sensor types. In addition, retrofitting solutions are possible in which, for example, a passive sensor is to be retrofitted with an active sensor, e.g. for the use of a vehicle in certain countries.

Figure 6D:
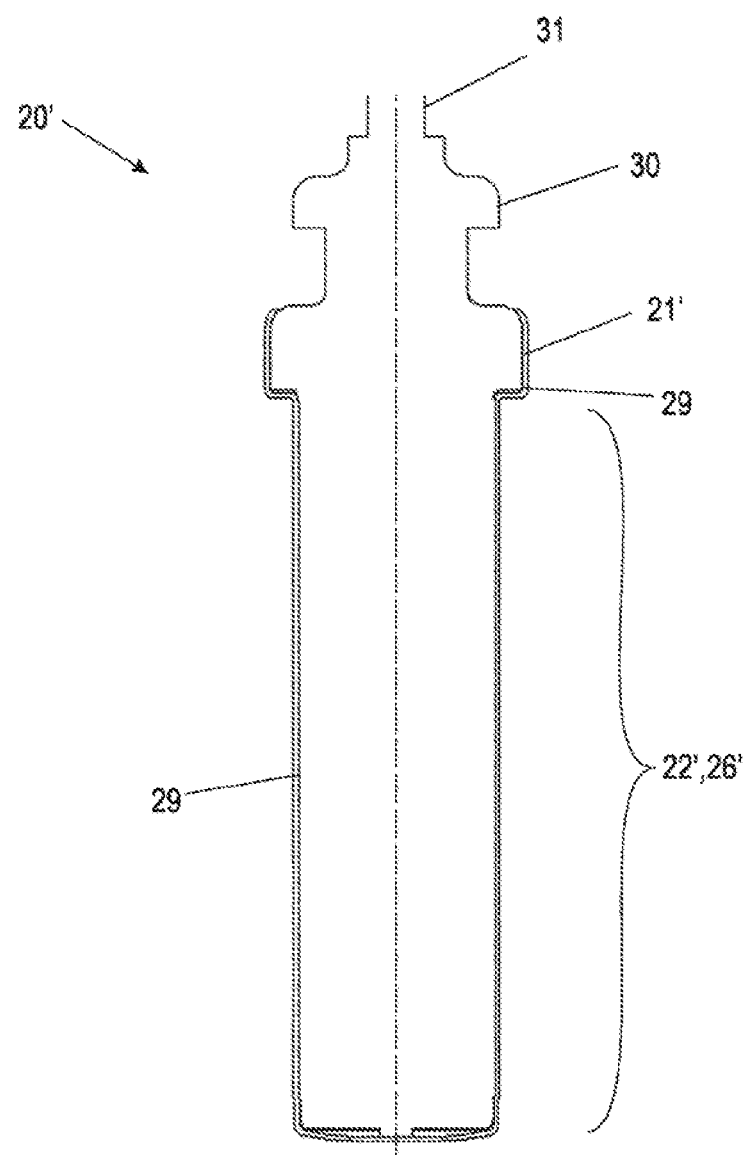

In FIG. 6d a modification of the passive sensor 20' of FIGS. 6a-c is shown analogous to FIG. 4d, which in turn has a sheathing 29 surrounding the sensor head 22. With regard to the configuration of the sheathing 29 and the advantages achieved by it, reference is made to the description of the embodiment example of FIG. 4d.

Figure 7A:
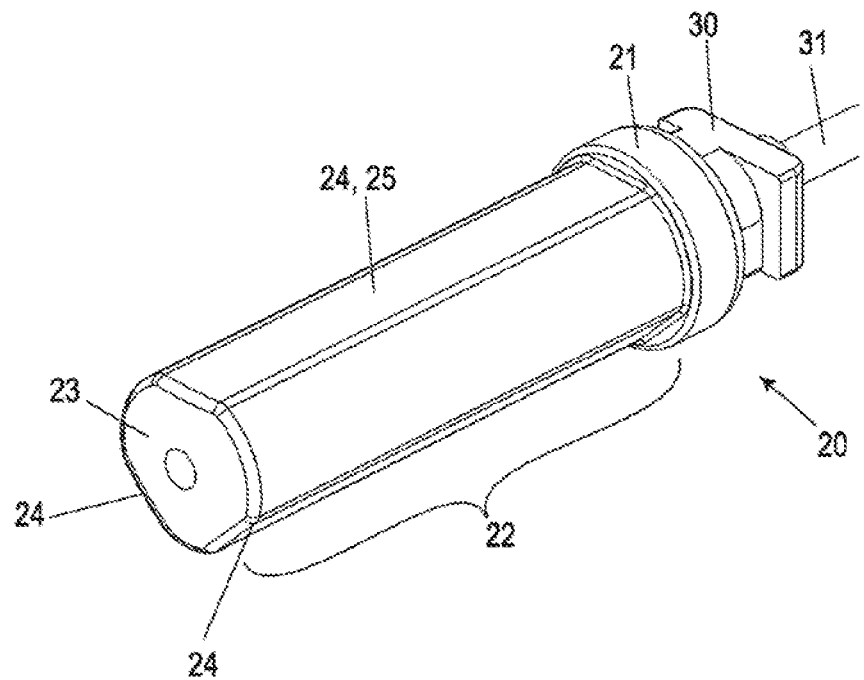
FIGS. 7a, 7b, and 7c show different views of an arrangement of a sensor and a clamping sleeve in a second embodiment example.
Figure 7B:
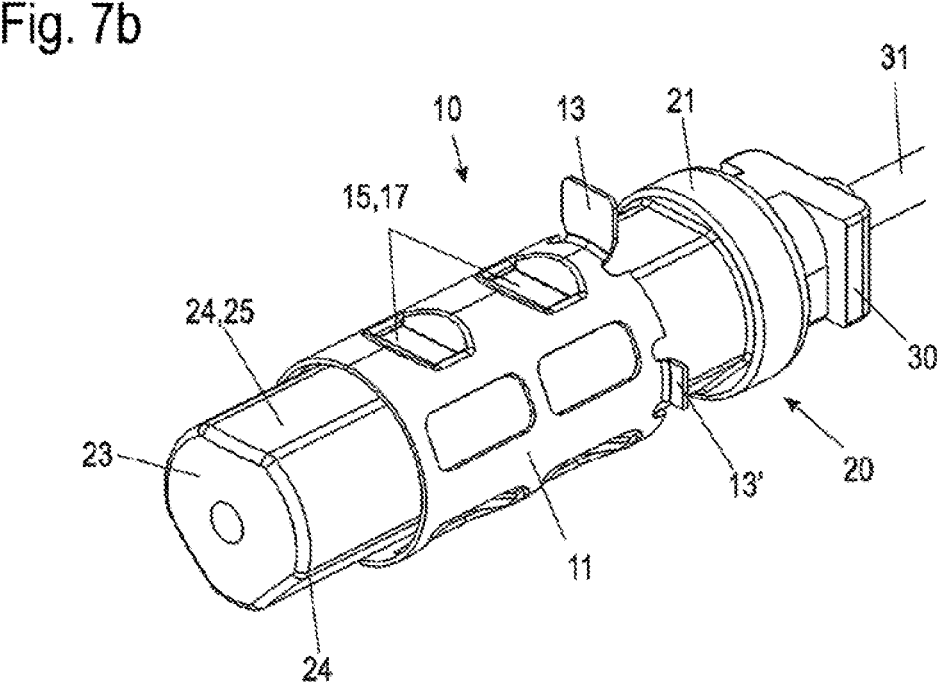
Figure 7C:
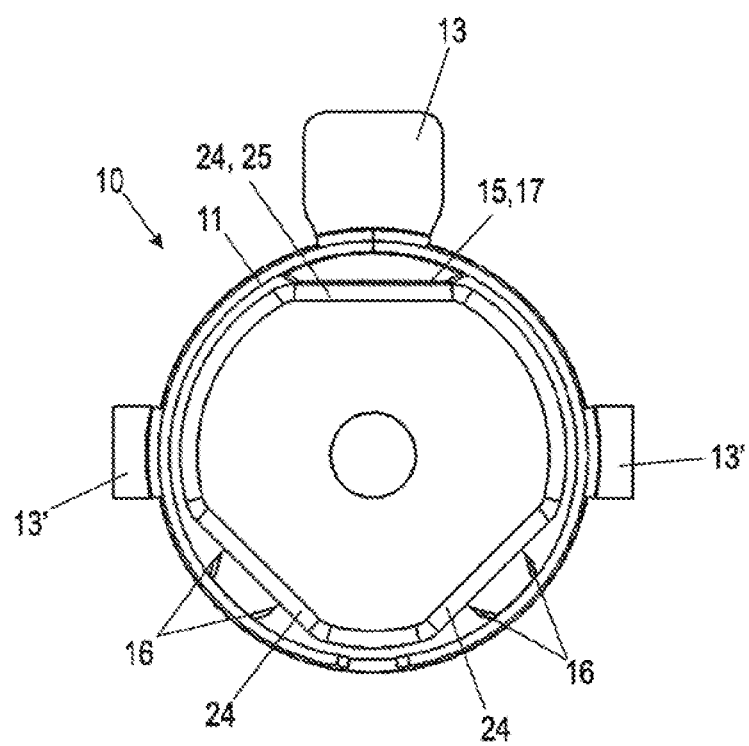

FIGS. 7a to 7c show a further embodiment example of an arrangement of clamping sleeve 10 and sensor 20 in the same way as FIGS. 3a to 3c. With regard to the basic structure, reference is made to the embodiment of the first embodiment example.

In contrast to the first embodiment example, sensor 20 has a cross-section in the area of sensor head 22 that comprises three side faces 24, two of which are at an angle of 90° to each other and a third at an angle of 45° to the first two. The remaining segments have an arc-shaped contour in cross-section.

In the clamping sleeve 10 there are spring elements 16 on the two side surfaces 24, which enclose an angle of 90° to each other. The third side surface 24 rests against an element that simultaneously serves as a dome 15 and a position-setting element 17. Accordingly, this side surface 24 also represents the orientation surface 25 of the sensor 20.

Figure 8A:
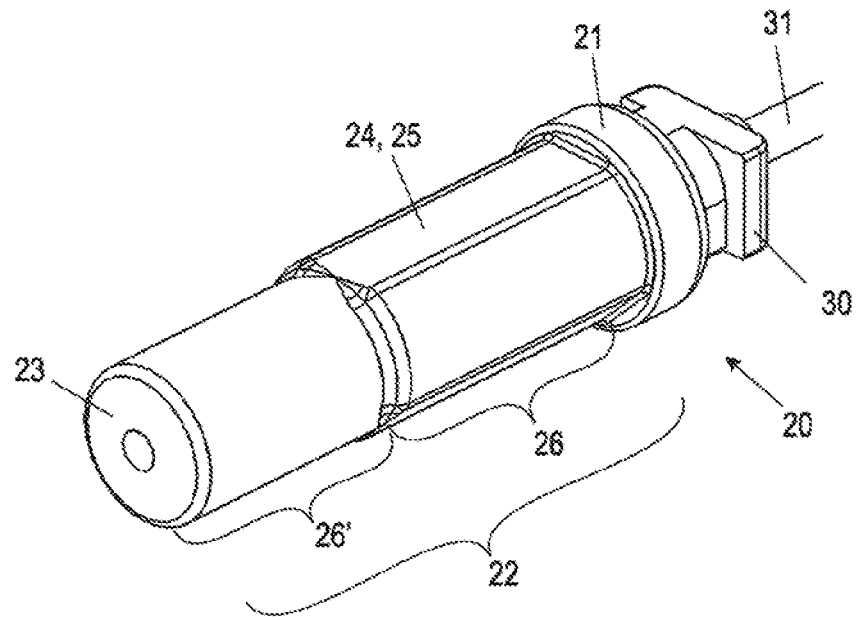
FIGS. 8a, 8b, and 8c show different views of a modification of the arrangement of the second embodiment example.
Figure 8B:
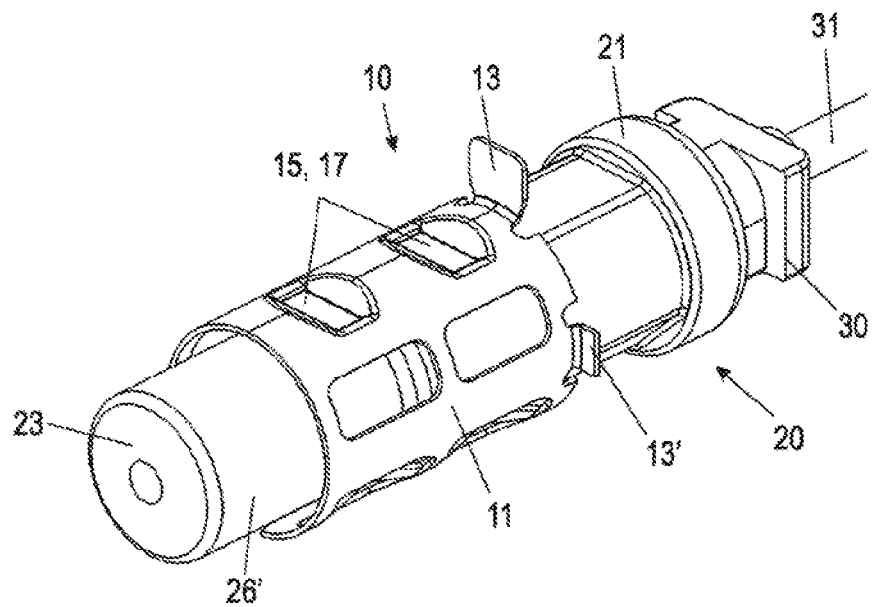
Figure 8C:
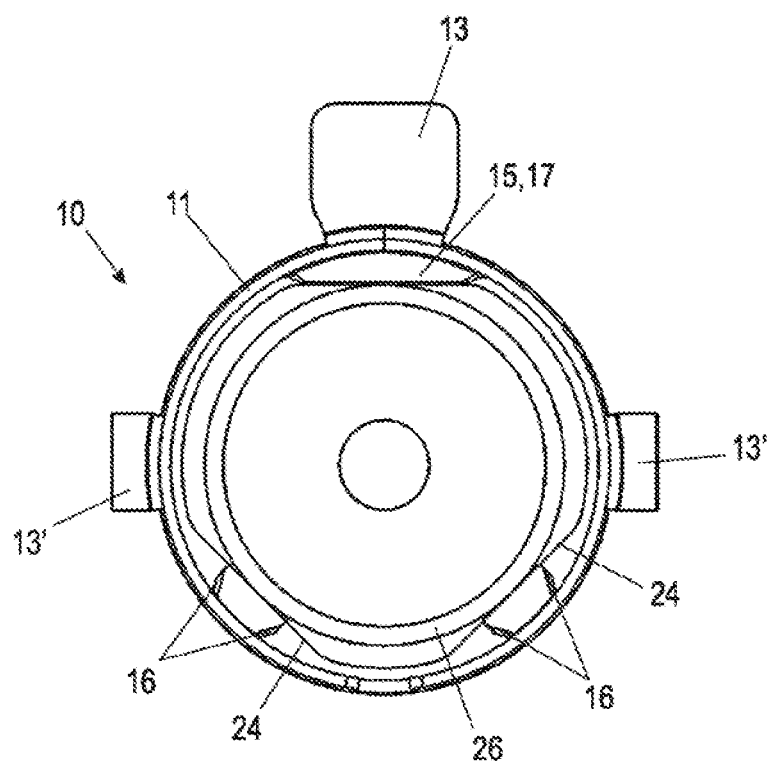

In FIGS. 8a to 8c, a modification of the second embodiment example is shown in the same way as in FIGS. 7a to 7c, in which the sensor 20 has a cylindrically symmetrical section 26' of the sensor head 22 in the front area. Again, the sides or orientation surfaces 24, 25 of the non-cylindrically symmetrical section 26 converge tangentially into the circumference of the cylindrical section 26'. The spring elements 16 and the dome 15 act accordingly both in the non-cylindrically symmetrical section 26 and in the cylindrically symmetrical section 26'. As shown in FIGS. 5a and 5b, the sensor shown in FIGS. 8a to 8c can also be used with a seal 19 sealed in the holder 1.

FIGS. 8a to 8c also show that the clamping sleeve 10 of the second embodiment example can also be used with a passively operating sensor 20' as shown in FIG. 6a. In this respect, it offers the same advantages as the clamping sleeve 10 of the first embodiment example.

Figure 9A:
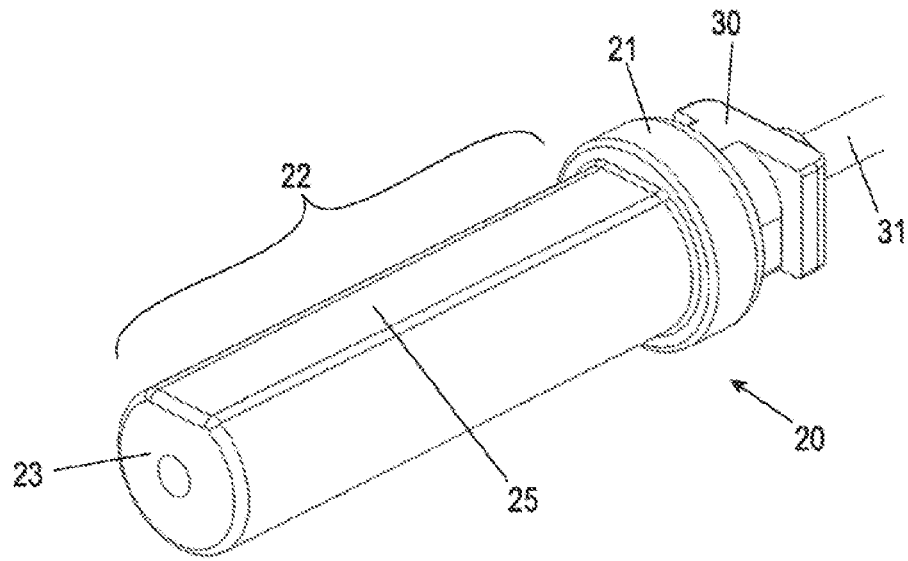
FIGS. 9a and 9b show different views of an arrangement of a sensor and a clamping sleeve in a third embodiment example.

FIGS. 9a, b to 14a, b show further embodiment examples of an arrangement of sensor 20 and clamping sleeve 10. In the figures with the suffix (a) the sensor 20 is shown separately in an isometric drawing. The figures with the suffix (b) show a top view of the front end of the clamping sleeve 10 with the sensor 20 inserted.

Figure 9B:
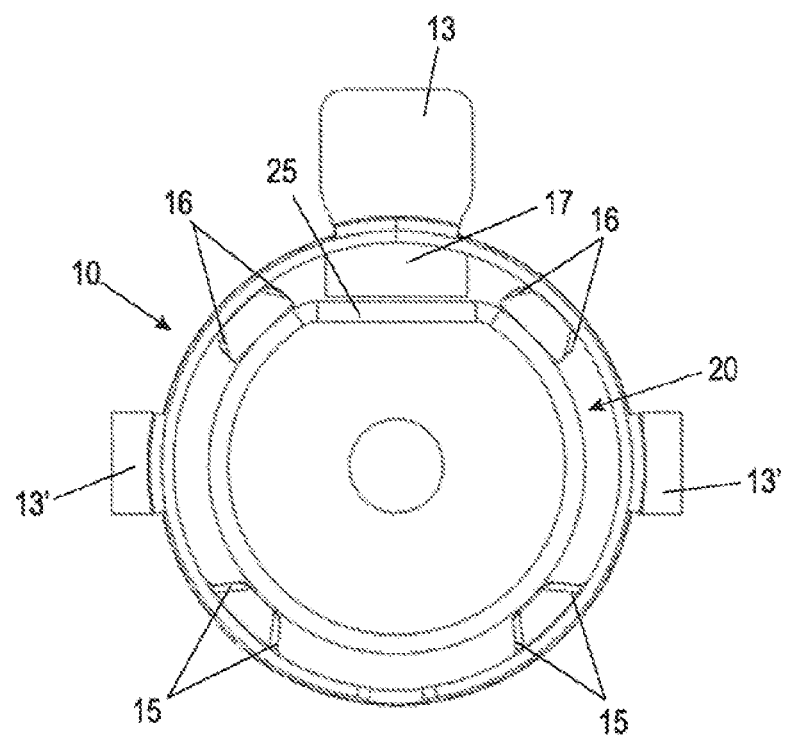
Figure 10A:
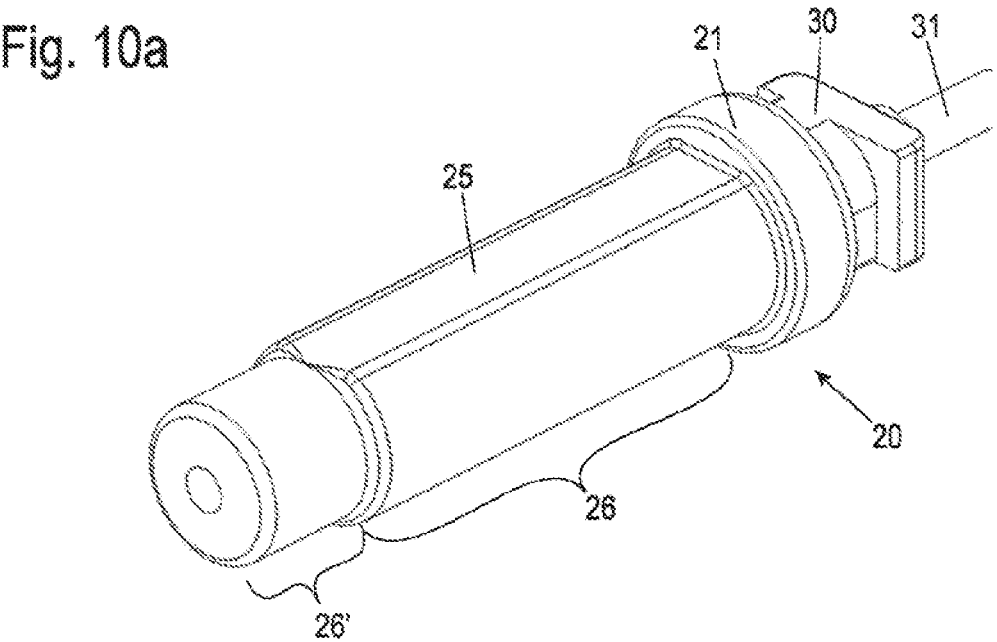
FIGS. 10a and 10b show different views of a modification of the arrangement of the third embodiment example.
Figure 10B:
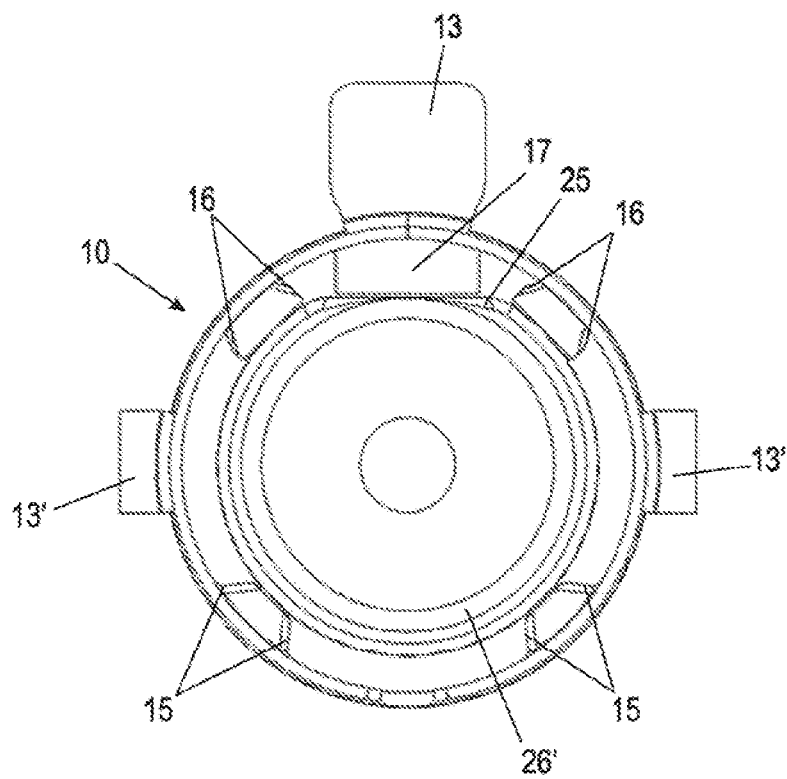
Figure 11A:
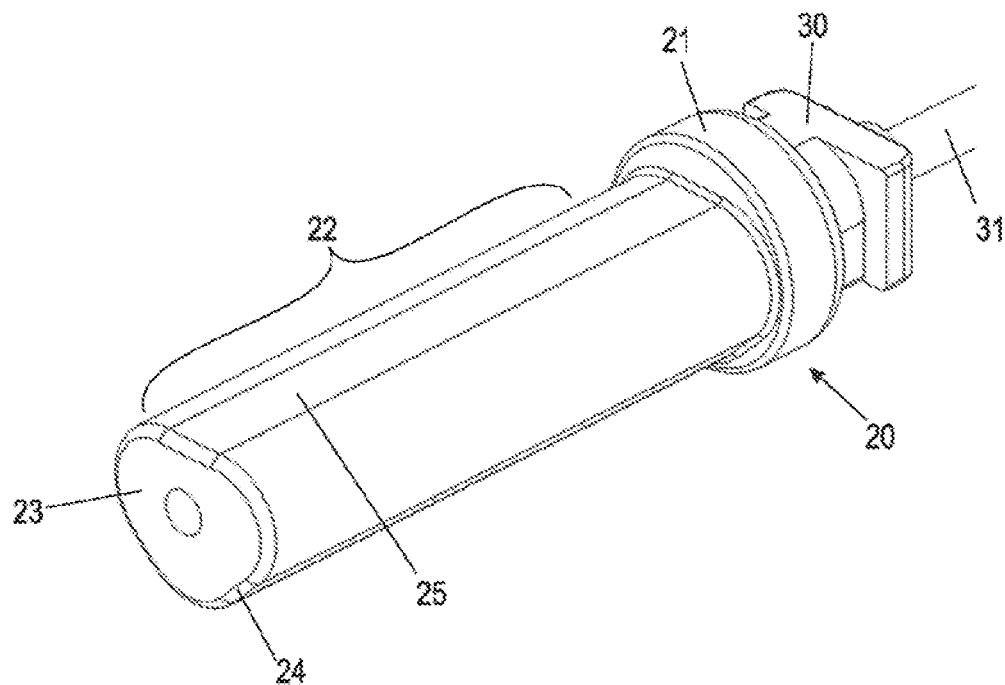
FIGS. 11a and 11b show different views of an arrangement of a sensor and a clamping sleeve in a fourth embodiment example.
Figure 11B:
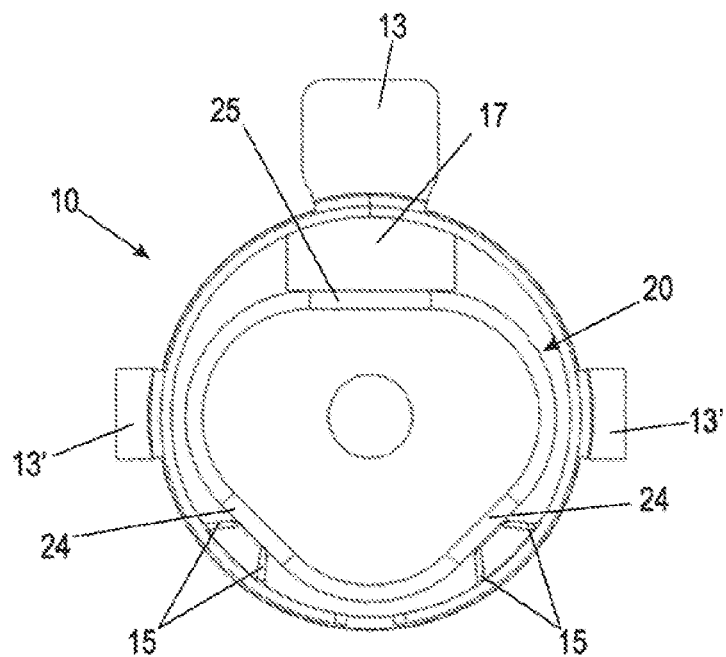
Figure 12A:
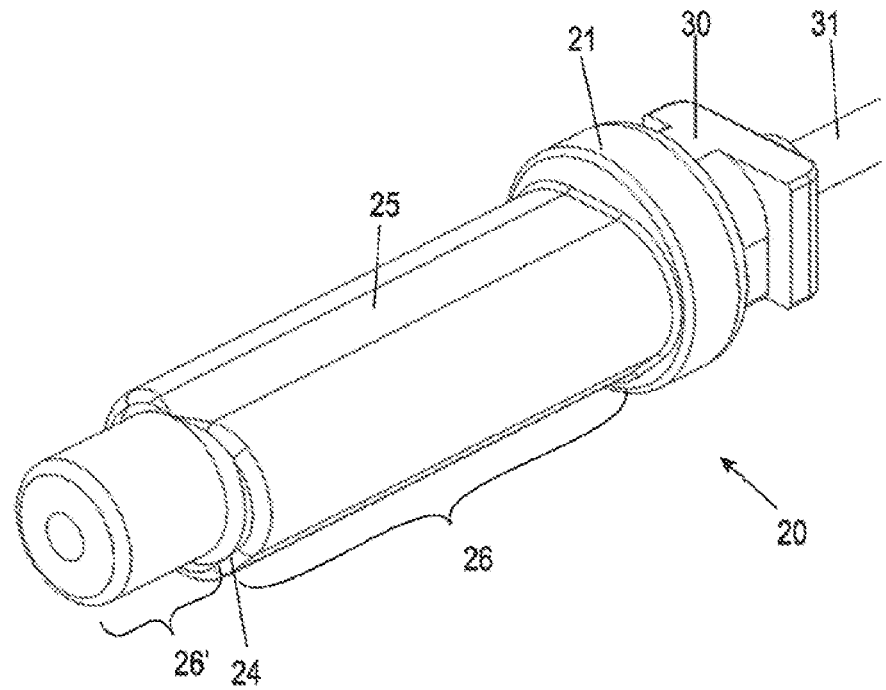
FIGS. 12a and 12b show different views of a modification of the arrangement of the fourth embodiment example.
Figure 12B:
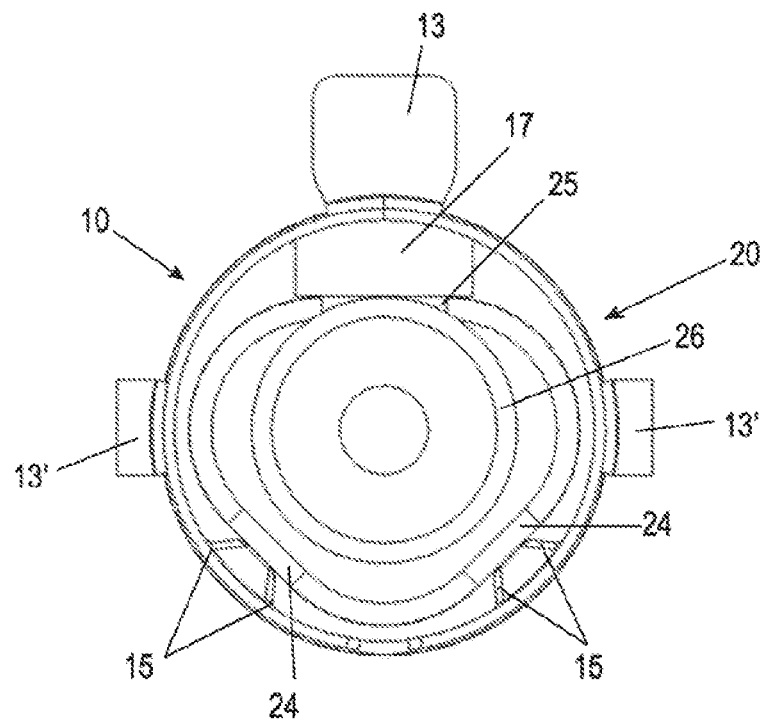

FIGS. 9, 11, 13 (in each case a, b) show three different embodiment examples in which the cross-section of the sensor head 22 is not formed in a cylindrically symmetrical manner over the entire length. FIGS. 10, 12, 14 (in each case a, b) show correlating configurations in which the sensor head 22 has a non-cylindrically symmetrical section 26 and a cylindrically symmetrical section 26' in the front region.

In the embodiment example of FIGS. 9a, b and 10a, b, the cross-section of the sensor head 22 or the non-cylindrically symmetrical section 26 is circular except for an orientation surface 25. When inserted into the clamping sleeve 10, the orientation surface 25 interacts with an appropriately configured position-setting element 17 so that the sensor 20 can only be inserted into the clamping sleeve 10 in a specified orientation. The mounting of the sensor 20 in the clamping sleeve 10 is again carried out by domes 15 and spring elements 16, which are opposite each other in pairs. In contrast to the embodiment examples shown above, these elements are without exception in contact with curved sections of the sensor head 22.

In the embodiment example of FIGS. 11a, b and 12a, b, the sensor head 21 or its non-cylindrically symmetrical section 26 has a rounded triangular cross-section with two side faces 24 and another side face 24 which also serves as an orientation surface 25. With regard to the basic structure, the embodiment example shown in these figures is similar to that of FIGS. 7a to 7c.

In the assigned clamping sleeve 10, the orientation surface 25 rests against the position-setting element 17, which at the same time assumes the function of the dome 15. Spring elements 16 press against the two remaining side surfaces 24. In alternative embodiments, it is also conceivable that the position-setting element 17 does not simultaneously form the dome 15, but the spring element 16.

Figure 13A:
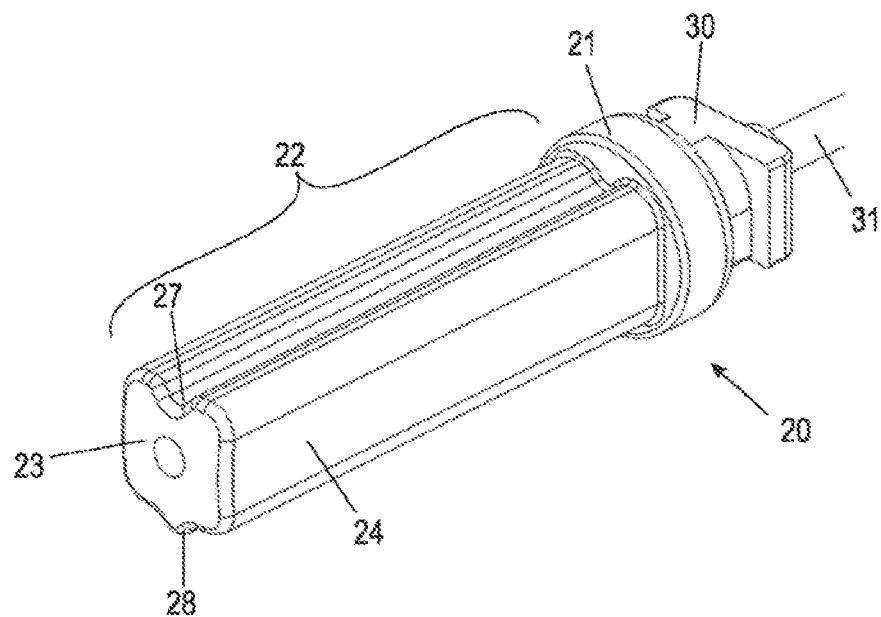
FIGS. 13a and 13b show different views of an arrangement of a sensor and a clamping sleeve in a fifth embodiment example.
Figure 13B:
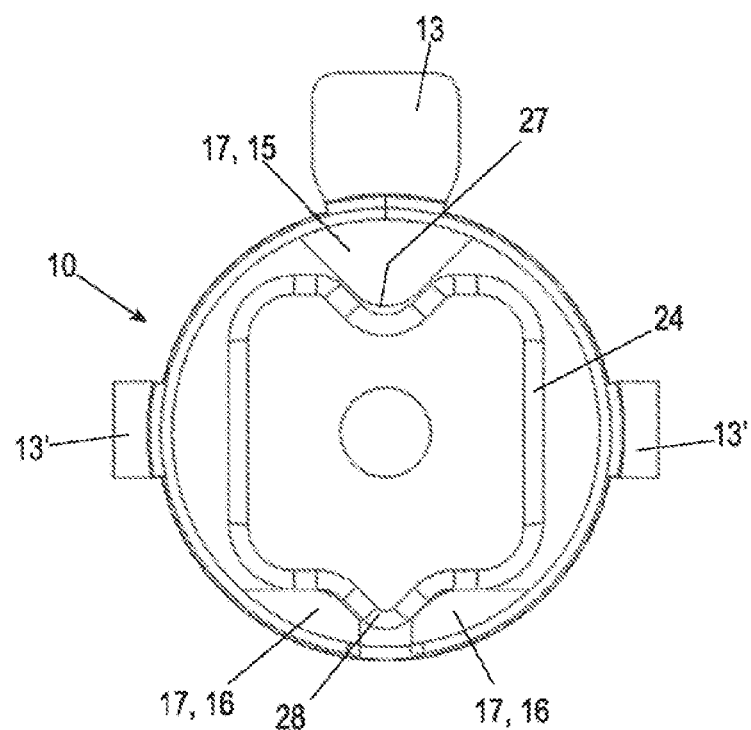
Figure 14A:
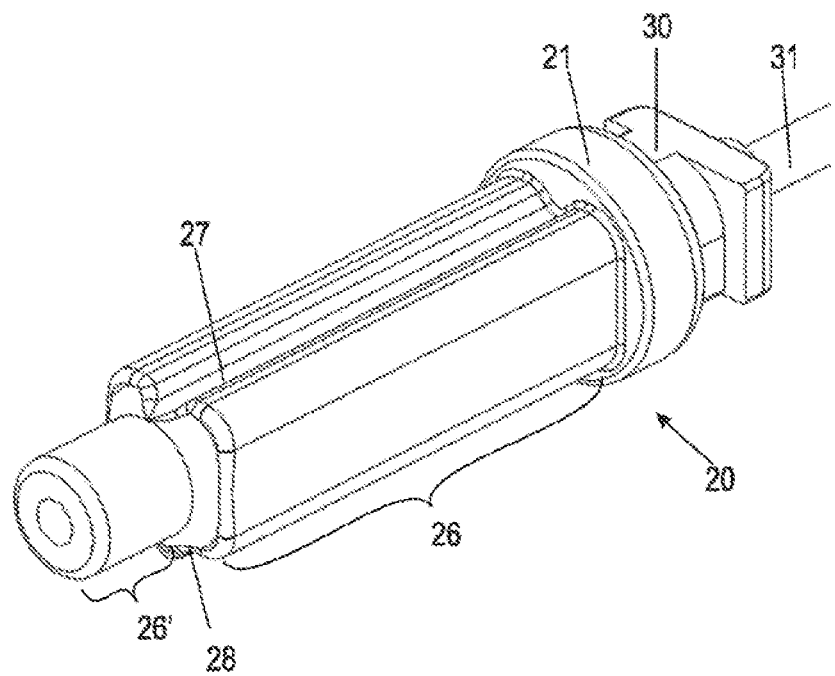
FIGS. 14a and 14b show different views of a modification of the arrangement of the fifth embodiment example.
Figure 14B:
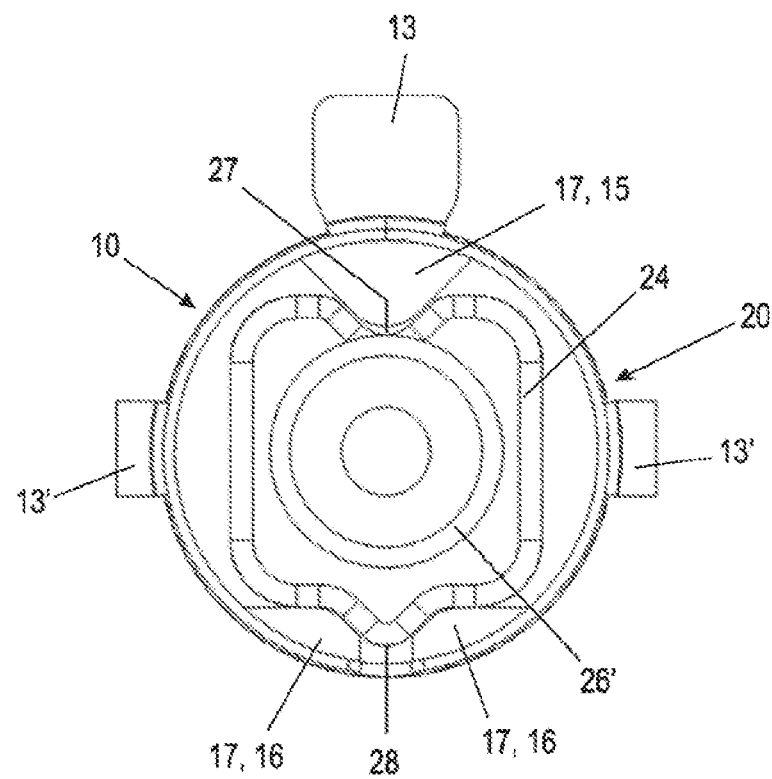

In the embodiment example of the FIGS. 13a, b and 14a, b, the sensor head 22 or its non-cylindrically symmetrical section 26 has a rather square cross-section with two oppositely arranged straight side surfaces 24. The surfaces shown in the figures above and below have groove- or feather-like orientation contours 27, 28 which interact with correspondingly complementary position-setting elements 17 of the clamping sleeve 10. As can be seen in FIGS. 13b and 14b, one of the position-setting elements 17 can be configured as a dome 15 and the opposite as a spring element 16. As an example, the position-setting element 17 engaging in the groove-shaped orientation contour 27 is configured as a dome 15 and the opposite as a spring element 16. This can be implemented the other way round in an alternative embodiment.

Figure 15:
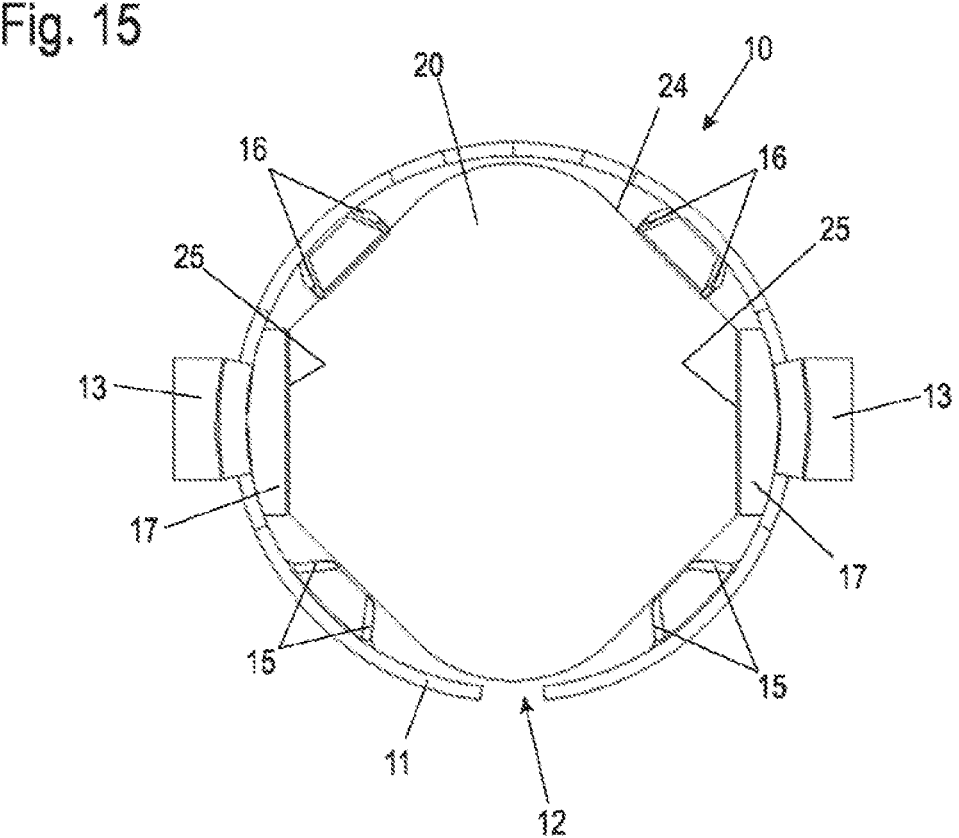
FIG. 15 shows a view of a further modification of the arrangement of the first embodiment example.
Figure 16:
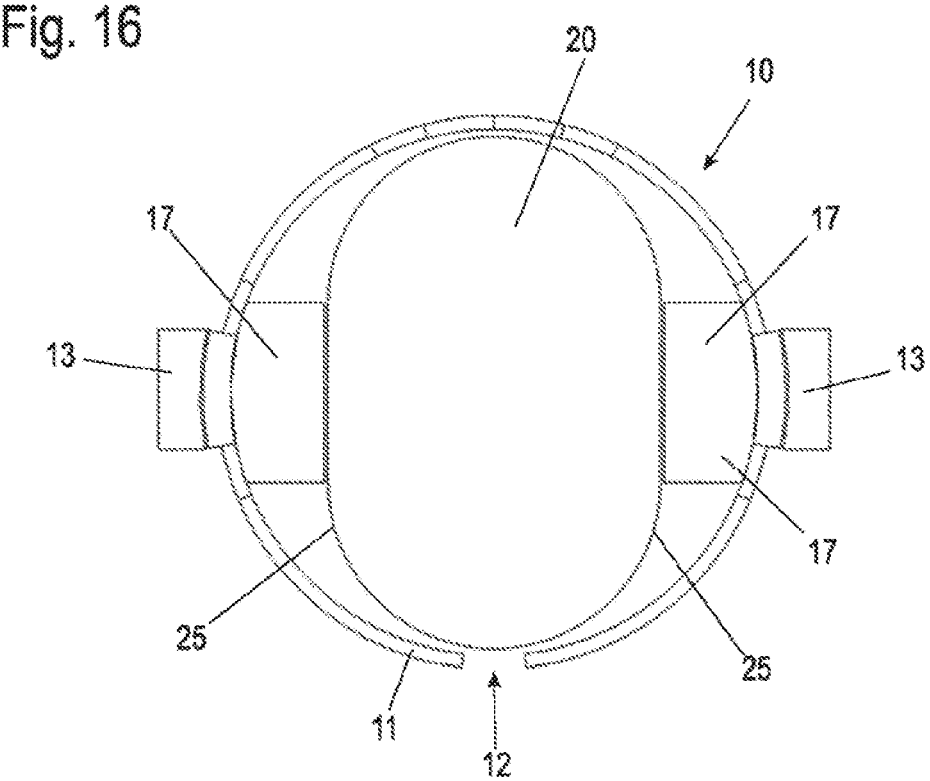
FIG. 16 shows a view of a further modification of the arrangement of the third embodiment example.

FIGS. 15 and 16 show further embodiment examples of clamping sleeve 10 and sensor 20 in which the orientation of the sensor 20 in the clamping sleeve 10 is not unambiguous, but two possible orientations are permitted which result from rotation of the sensor 20 about its longitudinal axis by 180°.

The embodiment example shown in FIG. 15 is a modification of the embodiment example shown in FIGS. 3a to 3c. The embodiment example shown in FIG. 16 represents a corresponding modification of the embodiment example shown in FIGS. 9a, b. The mentioned modifications are useful, for example, if the sensor 20 permits operation in one or the other position, wherein the sensor signal is either identical in both positions or differs only in its polarity, which can be easily corrected by an electronic evaluation system. The advantage for the user is that a suitable orientation can be found more easily, which can simplify the installation of the sensor 20 in the system.

The List of reference numerals is as follows:
1 Holder
2 Bore
3 Recess
4 Rotor
5 Pole tooth
10 Clamping sleeve
11 Base body
12 Slot
13, 13' Lug
14 Clamping and positioning element
15 Dome
16 Spring element
17 Position-setting element
18 Retaining lug
19 Seal
20, 20' Rotary pulse encoder (sensor)
21, 21' Sensor base
22, 22' Sensor head
23 Measuring tip
24 Orientation surface
24 Side surface
25 Orientation surface
26 Non-cylindrically symmetrical section
26' Cylindrically symmetrical section
27, 28 Orientation contour
29 Sheathing
30 Connection adapter
31 Connection cable

The invention claimed is:

1. An apparatus of a rotary pulse encoder and a sleeve, comprising:
   a rod-shaped rotary pulse encoder; and
   a clamping sleeve;
   wherein the rod-shaped rotary pulse encoder and the clamping sleeve are in a bore of a holder for sensing a rotational speed of a rotor, wherein the clamping sleeve is positioned in the bore so as to be secured against rotation, and the rotary pulse encoder is friction-locked in the clamping sleeve with a sensor head so as to be axially displaceable,
   wherein the sensor head has a non-cylindrically symmetrical cross-section at least in sections, and the clamping sleeve has at least one inwardly facing position-setting element, by which the sensor head is arranged in the clamping sleeve so as to be secured against rotation,
   wherein the clamping sleeve has at least one element by which it is non-rotatably positioned in the bore, and
   wherein the element includes an outwardly projecting lug.

2. The apparatus of claim 1, wherein the clamping sleeve includes at least one inwardly facing clamping and positioning element to hold the sensor head in an axially displaceable manner.

3. The apparatus of claim 2, wherein the at least one clamping and positioning element are rigidly formed or flexibly formed.

4. The apparatus of claim 1, wherein the position-setting element and/or the at least one clamping and positioning element are punched or embossed out of a base body of the clamping sleeve.

5. The apparatus of claim 1, wherein the lug also positions the clamping sleeve axially in the bore.

6. The apparatus of claim 1, wherein the shape of the sensor head defines one rotational position of the sensor head in the clamping sleeve, wherein the sensor head has a round cross-section and a flattened side that ensure a correct rotary position.

7. The apparatus of claim 1, wherein the shape of the sensor head defines more than one rotational position of the sensor head in the clamping sleeve, in which two positions rotated by 180° are provided if the rotary pulse encoder permits operation rotated by 180°.

8. The apparatus of claim 1, wherein the rotary pulse encoder includes a Hall sensor.

9. The apparatus of claim 1, wherein the sensor head is surrounded at least in sections by a sheathing.

10. An apparatus of a rotary pulse encoder and a sleeve, comprising:
    a rod-shaped rotary pulse encoder; and
    a clamping sleeve;
    wherein the rod-shaped rotary pulse encoder and the clamping sleeve are in a bore of a holder for sensing a rotational speed of a rotor, wherein the clamping sleeve is positioned in the bore so as to be secured against rotation, and the rotary pulse encoder is friction-locked in the clamping sleeve with a sensor head so as to be axially displaceable,
    wherein the sensor head has a non-cylindrically symmetrical cross-section at least in sections, and the clamping sleeve has at least one inwardly facing position-setting element, by which the sensor head is arranged in the clamping sleeve so as to be secured against rotation, wherein the clamping sleeve includes at least one inwardly facing clamping and positioning element to hold the sensor head in an axially displaceable manner, and wherein the at least one clamping and positioning element includes at least one rigid dome and a spring element which is opposite said dome.

11. The apparatus of claim 10, wherein the clamping sleeve has at least two rigid domes, each having an opposing spring element.

12. The apparatus of claim 11, wherein the two domes are arranged in the clamping sleeve so as to be rotated 90° relative to one another with respect to their radial position.

13. The apparatus of claim 10, wherein the clamping sleeve has at least one element by which it is non-rotatably positioned in the bore.

14. The apparatus of claim 13, wherein the element includes an outwardly projecting lug.

* * * * *